(12) United States Patent
Fankhauser et al.

(10) Patent No.: US 8,391,665 B2
(45) Date of Patent: Mar. 5, 2013

(54) OPTICAL PATCH PANEL DEVICE

(75) Inventors: Eric Fankhauser, Burlington (CA); Rakesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

(21) Appl. No.: 13/299,843

(22) Filed: Nov. 18, 2011

(65) Prior Publication Data

US 2012/0128293 A1  May 24, 2012

Related U.S. Application Data

(63) Continuation of application No. 12/603,686, filed on Oct. 22, 2009, now Pat. No. 8,078,028.

(60) Provisional application No. 61/107,497, filed on Oct. 22, 2008.

(51) Int. Cl.
*G02B 6/00* (2006.01)
*H01R 33/945* (2006.01)

(52) U.S. Cl. ............ 385/135; 385/134; 385/15; 385/16; 385/42; 385/88; 385/89; 385/12; 439/577

(58) Field of Classification Search .................... 385/88, 385/89, 92, 134, 135, 137, 39, 40, 42, 138, 385/15, 16, 12; 439/577

See application file for complete search history.

(56) References Cited

U.S. PATENT DOCUMENTS

| 5,394,503 | A | * | 2/1995 | Dietz et al. ................. 385/135 |
| 6,121,779 | A | * | 9/2000 | Schutten et al. ............. 324/627 |
| 6,487,327 | B1 | * | 11/2002 | Mock ............................ 385/12 |
| 7,020,359 | B2 | * | 3/2006 | Mayer ............................ 385/24 |
| 7,027,704 | B2 | * | 4/2006 | Frohlich et al. .............. 385/135 |
| 8,078,028 | B2 | * | 12/2011 | Fankhauser et al. ........ 385/135 |
| 2006/0024014 | A1 | * | 2/2006 | Ota et al. ..................... 385/135 |
| 2008/0122579 | A1 | * | 5/2008 | German et al. ............... 340/10.1 |
| 2008/0273844 | A1 | * | 11/2008 | Kewitsch ..................... 385/101 |
| 2010/0098375 | A1 | * | 4/2010 | Fankhauser ................... 385/16 |
| 2010/0098376 | A1 | * | 4/2010 | Fankhauser et al. .......... 385/16 |
| 2010/0158467 | A1 | * | 6/2010 | Hou et al. ..................... 385/135 |
| 2012/0128293 | A1 | * | 5/2012 | Fankhauser et al. .......... 385/16 |

* cited by examiner

*Primary Examiner* — Brian Healy

(74) *Attorney, Agent, or Firm* — Bereskin & Parr LLP/S.E.N.C.R.L./s.r.l.

(57) ABSTRACT

Various embodiments of patch panel devices are enclosed. In some embodiments, signals received are in an electrical or optical form and converted to the other form. The converted signal is provided as an output signal. A version of the original input may also be provided as an input. A signal injector can inject a optical or electrical signal that is selectively injected into the output signals. Various embodiments also include sensor to detecting the connecting of an electrical or optical line.

20 Claims, 7 Drawing Sheets

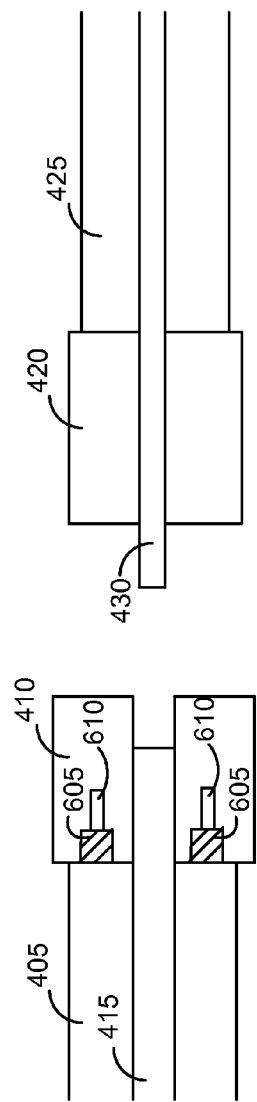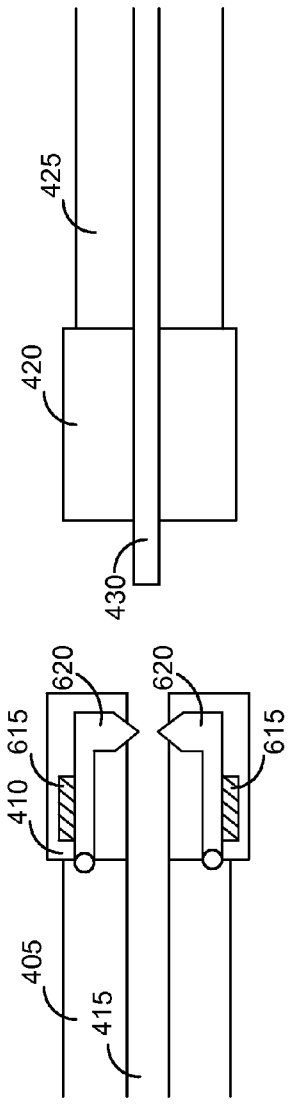
FIGURE 6A
FIGURE 6B

OPTICAL PATCH PANEL DEVICE

CROSS-REFERENCE TO RELATED APPLICATIONS

This application is a continuation of U.S. patent application Ser. No. 12/603,686, filed Oct. 22, 2009, which claims priority to U.S. Patent Application No. 61/107,497, filed Oct. 22, 2008. The entire contents of U.S. patent application Ser. No. 12/603,686 and U.S. Patent Application No. 61/107,497 are hereby incorporated by reference.

FIELD

This invention relates generally to the field of electrical and optical networking, and more particularly to the conversion, injection, and monitoring of electrical and optical signals.

BACKGROUND

The concept of using a patch port device for injecting and monitoring an electrical signal is well known. A patch port device is typically a passive symmetrical device, providing for an input port, an output port, a monitoring port, and an injection port. In the normal mode of operation, the patch port device simply allows for an input electrical signal to be passed through as an output electrical signal. However, there may occasionally be the need to inject another electrical signal as the output electrical signal or to monitor the input electrical signal. When an electrical cable is plugged into the monitoring port of the patch port device for monitoring the input electrical signal, the presence of the electrical cable at the monitoring port is physically detected so that the input electrical signal is no longer passed through as an output electrical signal. Instead, the input electrical signal is sent out to the electrical cable plugged in the monitoring port, controlled by a switch activated by the physical detection. Similarly, when an electrical cable is plugged into the injection port of the patch port device for injecting another electrical signal as the output electrical signal, the presence of the electrical cable at the injection port is physically detected so that the input electrical signal is no longer passed through as an output electrical signal. Instead, the injected signal coming from the electrical cable plugged in the injection port is sent out as the output electrical signal, controlled by a switch activated by the physical detection.

Prior networks relied on electrical lines to transmit information. However, fiber optic lines of newer systems are capable of much higher rates of transmission. As the use of optical networks becomes more prevalent, there is a need for an alternative to the patch port device described above that can provide for injection and monitoring of optical signals, as well as existing electrical signals, in addition to being able to provide for conversion between optical and electrical signals.

SUMMARY

The invention provides in one aspect an optical patch panel device comprising: an optical input port for receiving an input optical signal; an electrical output port for transmitting an output electrical signal; an optical-to-electrical converter for generating the output electrical signal in response to the input optical signal; a signal monitor for monitoring at least one of the input optical signal or the output electrical signal; a signal injector having an active and an inactive mode; wherein, when the a signal injector is in its active mode: the signal injector is operative to allow injection of an injected optical signal or an injected electrical signal; the output electrical signal corresponds to the injected signal; if the injected signal is an optical signal, the converter is adapted to generate the output electrical signal corresponding to the injected signal; if the injected signal is an electrical signal, the converter is inoperative (or alternatively switched out of the circuit); and wherein, when the signal injector is in its inactive mode, then the converter generates the output electrical signal corresponding to the input optical signal.

The invention provides in another aspect an optical patch panel device comprising: an electrical input port for receiving an input electrical signal; an optical output port for transmitting an output optical signal; an electrical-to-optical converter for generating the output optical signal in response to the input electrical signal; a signal monitor for monitoring at least one of the input electrical signal or the output optical signal; a signal injector having an active and an inactive mode; wherein, when the signal injector is in its active mode: the signal injector is operative to allow injection of an injected optical signal or an injected electrical signal; the output optical signal corresponds to the injected signal; if the injected signal is an electrical signal, the converter is adapted to generate the output optical signal corresponding to the injected signal; if the injected signal is an optical signal, the converter is inoperative (or alternatively switched out of the circuit); and wherein, when the signal injector is in its inactive mode, then the converter generates the output optical signal corresponding to the input electrical signal.

The invention further provides in another aspect the signal injector is controlled by a sensor that senses the connection of at least one of a second optical signal or a second electrical signal, wherein the sensor may be comprise: a) a light emitter and a light sensor, b) two capacitance plates, c) a microswitch and a button, and d) a micro-switch and one or more switch arms.

In some embodiments, the optical patch panel device may be hot-swappable.

Further aspects and advantages of the invention will appear from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show some examples of the present invention, and in which:

FIG. 6A is a cross-sectional diagram of an example implementation of an incoming cable and a cable receptacle of either the optical-to-electrical patch panel device of FIG. 2 or the electrical-to-optical patch panel device of FIG. 3 having a sensor including a micro-switch;

FIG. 6B is a cross-sectional diagram of an example implementation of an incoming cable and a cable receptacle of either the optical-to-electrical patch panel device of FIG. 2 or the electrical-to-optical patch panel device of FIG. 3 having a sensor having a micro-switch.

Figure 1:
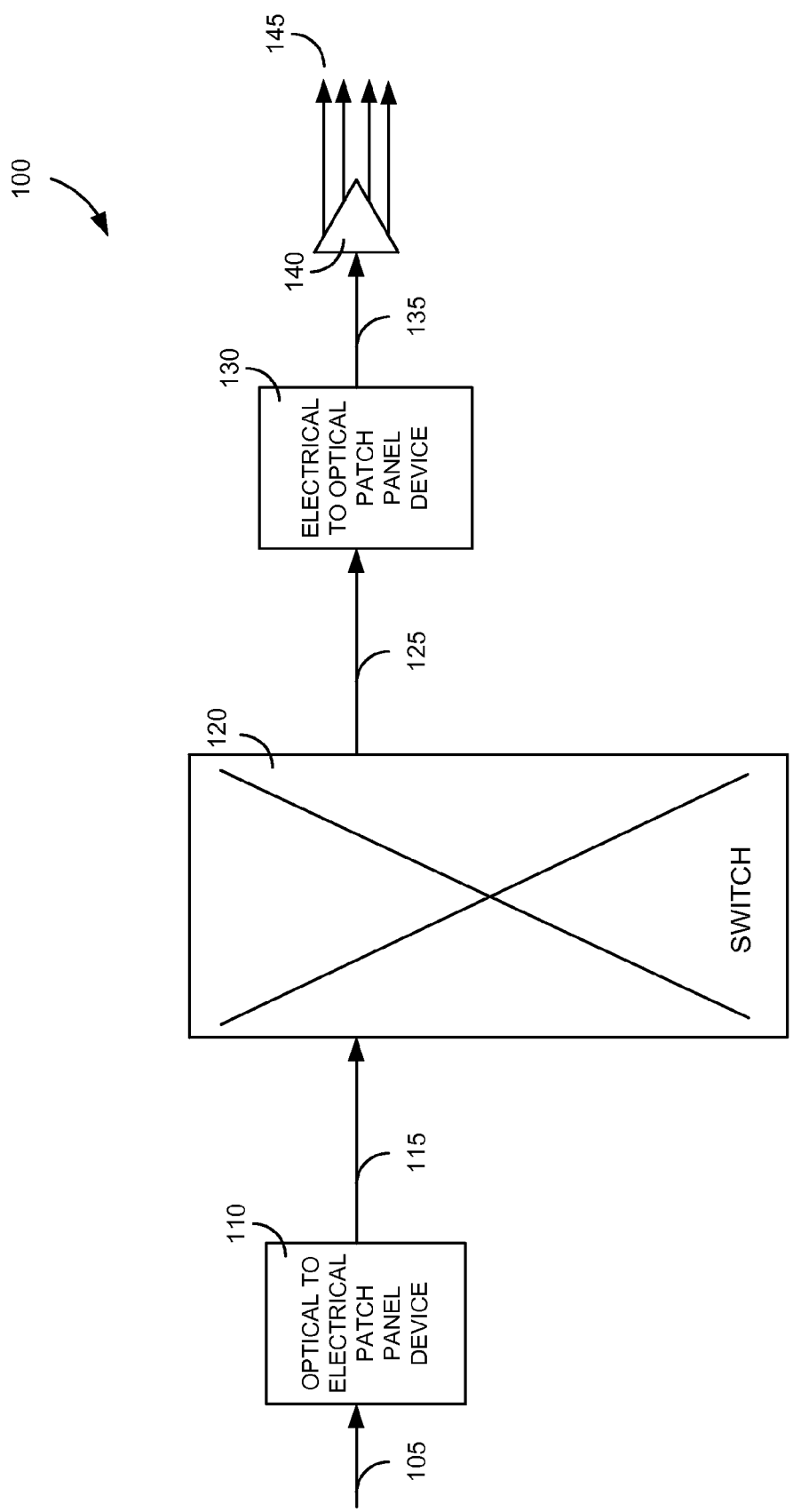
FIG. 1 is a block diagram of an example implementation of a switching system using an optical-to-electrical patch panel device and an electrical-to-optical patch panel device of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

Reference is first made to FIG. 1 showing an example implementation of a switching system 100 using an optical-to-electrical patch panel device 110 and an electrical-to-optical patch panel device 130 of the present invention. Switching system 100 is adapted for receiving an input-side incoming optical signal 105 and transmitting output-side outgoing optical signal 135. Input-side incoming optical signal 105 and output-side outgoing optical signal 135 may be any type of optical signal carrying any content.

In the normal mode of operation, on the input-side of switch 120, an input-side incoming optical signal 105 is received by an optical-to-electrical patch panel device 110 and transmitted as an input-side outgoing electrical signal 115. The input-side outgoing electrical signal 115 is then passed through switch 120 and transmitted as an output-side incoming electrical signal 125. The output-side incoming electrical signal 125 is received by an electrical-to-optical patch panel device 130 and transmitted as an output-side outgoing electrical signal 135. Additionally, the output-side outgoing optical signal 135 may then be passed through a distribution amplifier 140, generating distributed output optical signals 145 for further transmission.

Switch 120 is capable of forming a connection between any input and any output, and preferably, should form a plurality of simultaneous connections. Where a connection is formed, the desired input signal is conveyed to the desired output signal. It should be noted that although in the example implementation of switching system 100, switch 120 is an electrical switch, switch 120 may be any kind of switch depending on the type of input and output signals it receives. For example, switch 120 may be an optical switch if it receives an optical signal from electrical-to-optical patch panel device 130 and generates an optical signal for optical-to-electrical patch panel device 110.

Figure 2:
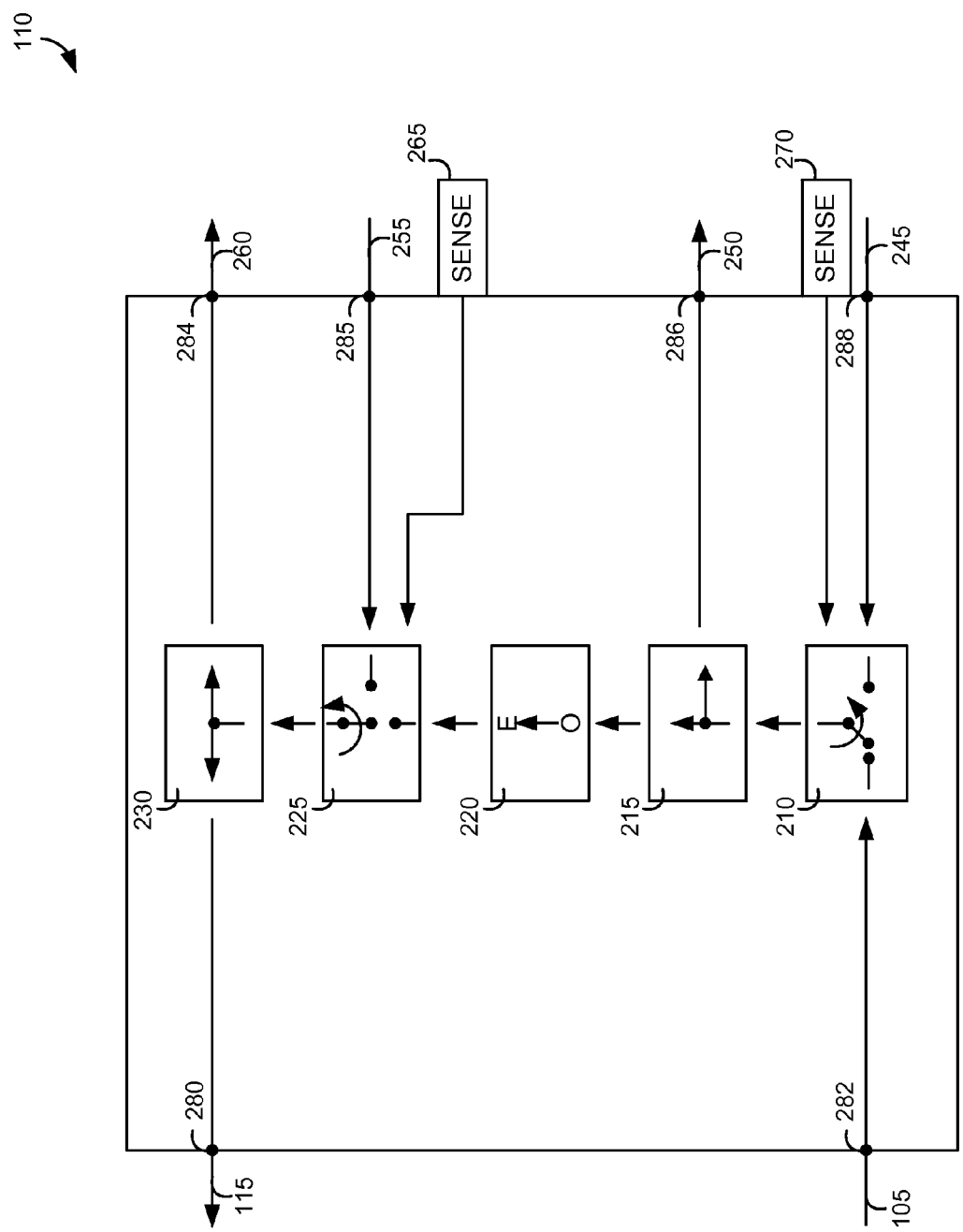
FIG. 2 is an illustrative block diagram of the optical-to-electrical patch panel device of FIG. 1.

Reference is next made to FIG. 2 illustrating optical-to-electrical patch panel device 110 for use in switching system 100. Optical-to-electrical patch panel device 110 is adapted to provide a signal converter, as well as signal injection and signal monitoring. It should be noted that optical-to-electrical patch panel device 110 does not necessarily have to be on the input-side of switch 120, rather, optical-to-electrical patch panel device 110 may be any patch panel device adapted for optical-to-electrical signal conversion in a switching system.

Optical-to-electrical patch panel device 110 has input-side incoming optical signal port 282 for receiving input-side incoming optical signal 105 and input-side outgoing electrical signal port 280 for transmitting input-side outgoing electrical signal 115.

Optical-to-electrical patch panel device 110 may additionally include ports for injecting either an electrical inject signal or an optical inject signal. Similarly, optical-to-electrical patch panel device 110 may additionally include ports for monitoring either an electrical monitor signal or an optical monitor signal. For example, optical-to-electrical patch panel device 110 may have at least one of input-side optical inject signal port 288 for receiving input-side optical inject signal 245, input-side optical monitor signal port 286 for transmitting input-side optical monitor signal 250, input-side electrical inject signal port 285 for receiving input-side electrical inject signal 255, and input-side electrical monitor signal port 284 for transmitting input-side electrical monitor signal 260.

In the normal mode of operation, input-side incoming optical signal 105 is received at input-side optical signal port 282 for optical-to-electrical conversion through optical-to-electrical patch panel device 110 and transmitted as input-side outgoing electrical signal 115 at input-side outgoing electrical signal port 280. Specifically, input-side incoming optical signal 105 is received at input-side incoming optical signal port 282 of optical-to-electrical patch panel device 110, transmitted through switch 210, further transmitted through splitter 215, further transmitted through optical-to-electrical signal converter 220, further transmitted through switch 225, and further transmitted to splitter 230, before being transmitted out of optical-to-electrical patch panel device 110 through input-side outgoing electrical signal port 280 as input-side outgoing electrical signal 115.

Occasionally, there may be the need to inject an alternate electrical signal or an alternate optical signal and have it transmitted as input-side outgoing electrical signal 115, instead of having input-side incoming optical signal 105 pass through as input-side outgoing electrical signal 115. Where input-side optical inject signal 245 is received at input-side optical inject signal port 288, a sensor 270 detects either the presence of input-side optical inject signal 245 or a connection at input-side optical inject signal port 288 and controls switch 210 so that the input-side optical inject signal 245 is transmitted through splitter 215, instead of input-side incoming optical signal 105, for optical-to-electrical conversion. Similarly, where input-side electrical inject signal 255 is received at input-side electrical inject signal port 285, a sensor 265 detects either the presence of input-side electrical inject signal 255 or a connection at input-side electrical inject signal port 285 and controls switch 225 so that the input-side electrical inject signal 255 is transmitted through to splitter 230 instead of the converted input-side incoming optical signal received from optical-to-electrical converter 220.

It should be noted that switches 210 and 225 may be an optical switch or an electrical switch, respectively. Alternatively, switch 210 may be a combiner for combining input-side incoming optical signal 105 to be further transmitted to splitter 215, such that when sensor 270 detects the presence of input-side optical inject signal 245 or a connection at input-side optical inject signal port 288, the combiner is disabled, and instead, input-side optical inject signal 245 is combined to be further transmitted to splitter 215. Similarly, switch 225 may be a combiner for combining converted input-side incoming optical signal from optical-to-electrical converter 220 to be further transmitted to splitter 230, such that when sensor 265 detects the presence of input-side electrical inject signal 255 or a connection at input-side electrical inject signal port 285, the combiner is disabled, and instead, input-side electrical inject signal 255 is combined to be further transmitted to splitter 230.

In some other embodiments, switch 210 may be replaced with a passive combiner that couples an incoming optical signal 105 or optical inject signal 245 to the splitter 215. A passive combiner will couple either or both of the signals 105, 245 when they are present. This would allow an operator of the device to couple one or more of signals 105, 245 to the device 110 such that either or both signals are coupled passively by the combiner to splitter 215, without requiring a sensor to detect the presence of the signals or cables carrying the signals.

Returning to a description of the example device 110, sensors 265 and 270 may be any type of sensing devices, whether physical, mechanical, electrical, or optical, that are capable of detecting the connection of an input-side optical inject signal 245 at input-side optical inject signal port 288 or the connection of an input-side electrical inject signal 255 at input-side electrical inject signal port 285.

Occasionally, there may also be the need to monitor the input-side incoming optical signal 105. In addition to transmitting input-side incoming optical signal through to optical-to-electrical signal converter 220, splitter 215 may transmit input-side incoming optical signal as input-side optical monitor signal 250 through input-side optical monitor signal port 286. Similarly, in addition to transmitting converted input-side incoming optical signal as input-side outgoing electrical signal 115, splitter 230 may transmit converted input-side incoming optical signal as input-side electrical monitor signal 260 through input-side electrical monitor signal port 284.

Figure 3:
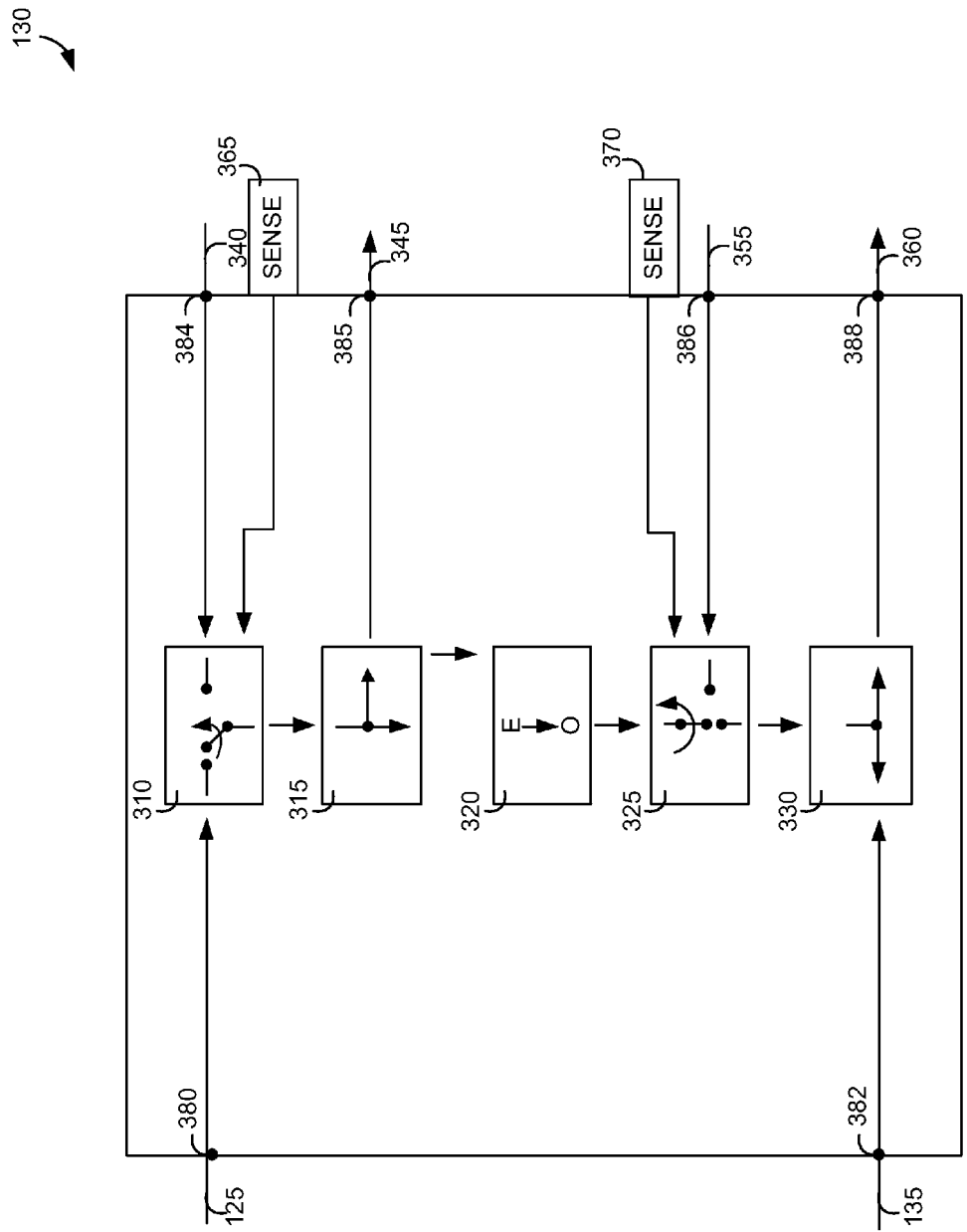
FIG. 3 is an illustrative block diagram of the electrical-to-optical patch panel device of FIG. 1.

Reference is next made to FIG. 3 illustrating electrical-to-optical patch panel device 130 for use in switching system 100. Electrical-to-optical patch panel device 130 is adapted to provide a signal converter, as well as signal injection and signal monitoring. It should be noted that electrical-to-optical patch panel device 130 does not necessarily have to be on the output-side of switch 120, rather, electrical-to-optical patch panel device 130 may be any patch panel device adapted for electrical-to-optical signal conversion in a switching system.

Electrical-to-optical patch panel device 130 has output-side incoming electrical signal port 380 for receiving output-side incoming electrical signal 125 and output-side outgoing optical signal port 382 for transmitting output-side outgoing optical signal 135.

Electrical-to-optical patch panel device 130 may additionally include ports for injecting either an electrical inject signal or an optical inject signal. Similarly, electrical-to-optical patch panel device 130 may additionally include ports for monitoring either an electrical monitor signal or an optical monitor signal. For example, electrical-to-optical patch panel device 130 may have at least one of output-side optical monitor signal port 388 for transmitting output-side optical monitor signal 360, output-side optical inject signal port 386 for receiving output-side optical inject signal 355, output-side electrical monitor signal port 385 for transmitting output-side electrical monitor signal 345, and output-side electrical inject signal port 384 for receiving output-side electrical inject signal 340.

In the normal mode of operation, output-side incoming electrical signal 125 is received at output-side electrical signal port 380 for electrical-to-optical conversion through electrical-to-optical patch panel device 130 and transmitted as output-side outgoing optical signal 135 at output-side outgoing optical signal port 382. Specifically, output-side incoming electrical signal 125 is received at output-side incoming electrical signal port 380 of electrical-to-optical patch panel device 130, transmitted through switch 310, further transmitted through splitter 315, further transmitted through electrical-to-optical signal converter 320, further transmitted through switch 325, and further transmitted through splitter 330, before being transmitted out of electrical-to-optical patch panel device 130 through output-side outgoing optical signal port 382 as output-side outgoing optical signal 135.

Occasionally, there may be the need to inject an alternate electrical signal or an alternate optical signal and have it transmitted as output-side outgoing optical signal 135, instead of having output-side incoming electrical signal 125 pass through as output-side outgoing optical signal 135. Where output-side electrical inject signal 340 is received at output-side electrical inject signal port 384, a sensor 365 detects either the presence of output-side electrical inject signal 340 or a connection at output-side electrical inject signal port 384 and controls switch 310 so that the output-side electrical inject signal 340 is transmitted through splitter 315 instead of output-side incoming electrical signal 125. Similarly, where output-side optical inject signal 355 is received at output-side optical inject signal port 386, a sensor 370 detects the either the presence of output-side optical inject signal 355 or a connection at output-side optical inject signal port 386 and controls switch 325 so that the output-side optical inject signal 355 is transmitted through to splitter 330 instead of the converted output-side incoming electrical signal received from electrical-to-optical converter 320.

It should be noted that switches 310 and 325 may be an optical switch or an electrical switch, respectively. Alternatively, switch 310 may be a combiner for combining output-side incoming electrical signal 125 to be further transmitted to splitter 315, such that when sensor 365 detects the presence of output-side electrical inject signal 340 or a connection at output-side electrical inject signal port 384, the combiner is disabled, and instead, output-side electrical inject signal 340 is combined to be further transmitted to splitter 315. Similarly, switch 325 may be a combiner for combining converted output-side incoming electrical signal from electrical-to-optical converter 320 to be further transmitted to splitter 330, such that when sensor 370 detects the presence of output-side optical inject signal 355 or a connection at output-side optical inject signal port 386, the combiner is disabled, and instead, output-side optical inject signal 355 is combined to be further transmitted to splitter 330.

In some other embodiments, switch 310 may be replaced with a passive combiner, as described above in relation to switch 210, that passively combines one or both of signals 125 and 340 and couples them to splitter 315.

Sensors 365 and 370 may be any type of sensing devices, whether physical, mechanical, electrical, or optical, that are capable of detecting the connection of an output-side electrical inject signal 340 at output-side electrical inject signal port 384 or the connection of an output-side optical inject signal 355 at output-side optical inject signal port 386.

Occasionally, there may be the need to monitor the output-side incoming electrical signal 125. In addition to transmitting output-side incoming electrical signal through to electrical-to-optical signal converter 320, splitter 315 may transmit output-side incoming electrical signal as output-side electrical monitor signal 345 through output-side electrical monitor signal port 385. Similarly, in addition to transmitting converted output-side incoming electrical signal as output-side outgoing optical signal 135, splitter 330 may transmit converted output-side incoming electrical signal as output-side optical monitor signal 360 through output-side optical monitor signal port 388.

Figure 4:
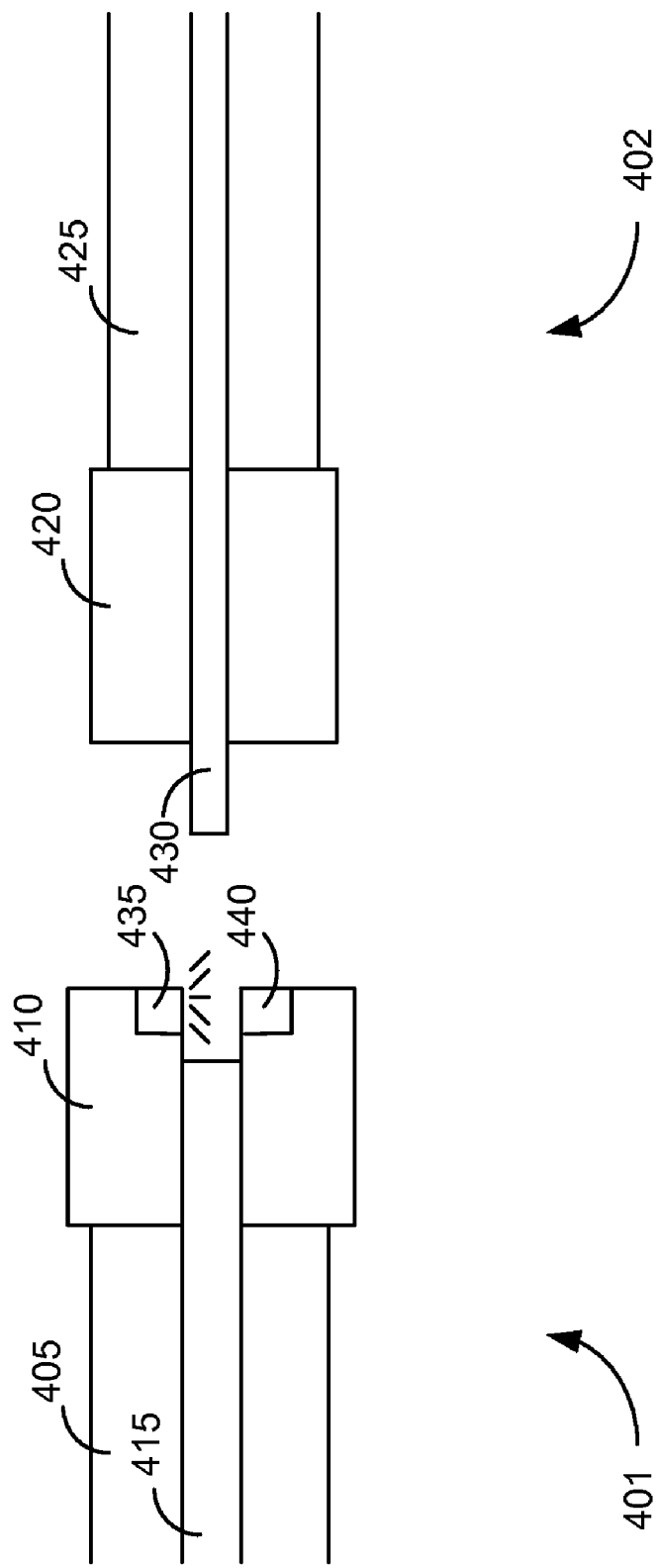
FIG. 4 is a cross-sectional diagram of an example implementation of an incoming cable and a cable receptacle of either the optical-to-electrical patch panel device of FIG. 2 or the electrical-to-optical patch panel device of FIG. 3 having a sensor including a light emitter and a light sensor.

Reference is next made to FIG. 4, showing cross-sectionally an incoming cable 402 and a cable receptacle 401 of an inject signal port of either optical-to-electrical patch panel device 110 or electrical-to-optical patch panel device 130 having light emitter 435 and light sensor 440 as sensors 265, 270, 365, or 370.

On optical-to-electrical patch panel device 110, cable receptacle 401 would be representative of input-side electrical inject signal port 285 or input-side optical inject signal port 288. Accordingly, incoming cable 402 would be transmitting input-side electrical inject signal 255 or input-side optical inject signal 245.

On electrical-to-optical patch panel device 130, cable receptacle 401 would be representative of output-side electrical inject signal port 385 or output-side optical inject signal port 386. Accordingly, incoming cable 402 would be transmitting output-side electrical inject signal 340 or output-side optical inject signal 355.

Cable receptacle 401 is comprised of cable receptacle housing 405, which houses cable receptacle fiber 415 for transmitting a signal. Cable receptacle adapter 410 is attached to the end of cable receptacle housing 405 for connection with incoming cable 402. Similarly, incoming cable 402 is comprised of cable housing 425, which houses cable fiber 430 for transmitting a signal. Cable adapter 420 is attached to the end of cable housing 425 for connection with cable receptacle 401. Cable receptacle adapter 410 of cable receptacle 401 is adapted to accommodate the connection of cable adapter 420 of incoming cable 402 such that when the two parts are connected, cable receptacle fiber 415 is connected to cable fiber 430 allowing a signal from incoming cable 402 to be transmitted to cable receptacle 401.

In the illustrated embodiment, cable receptacle adapter 410 has a light emitter 435 and a light sensor 440 mounted on it. For example, light emitter 435 and light sensor 440 may be mounted on either sides of where cable fiber 430 of incoming cable 402 is to connect with cable receptacle 401. Thus, when incoming cable 402 is not connected to cable receptacle 401, the light sensor 440 detects the presence of light generated by light emitter 435. However, when incoming cable 402 is connected to cable receptacle 401, the light sensor 440 is not able to detect the presence of light generated by light emitter 435 because the light generated is broken by the connection of cable fiber 430 to cable receptacle fiber 415. Accordingly, using this beam-break mechanism, the sensor 265, 270, 365, or 370 of either optical-to-electrical patch panel device 110 or electrical-to-optical patch panel device 130 may be implemented.

Figure 5:
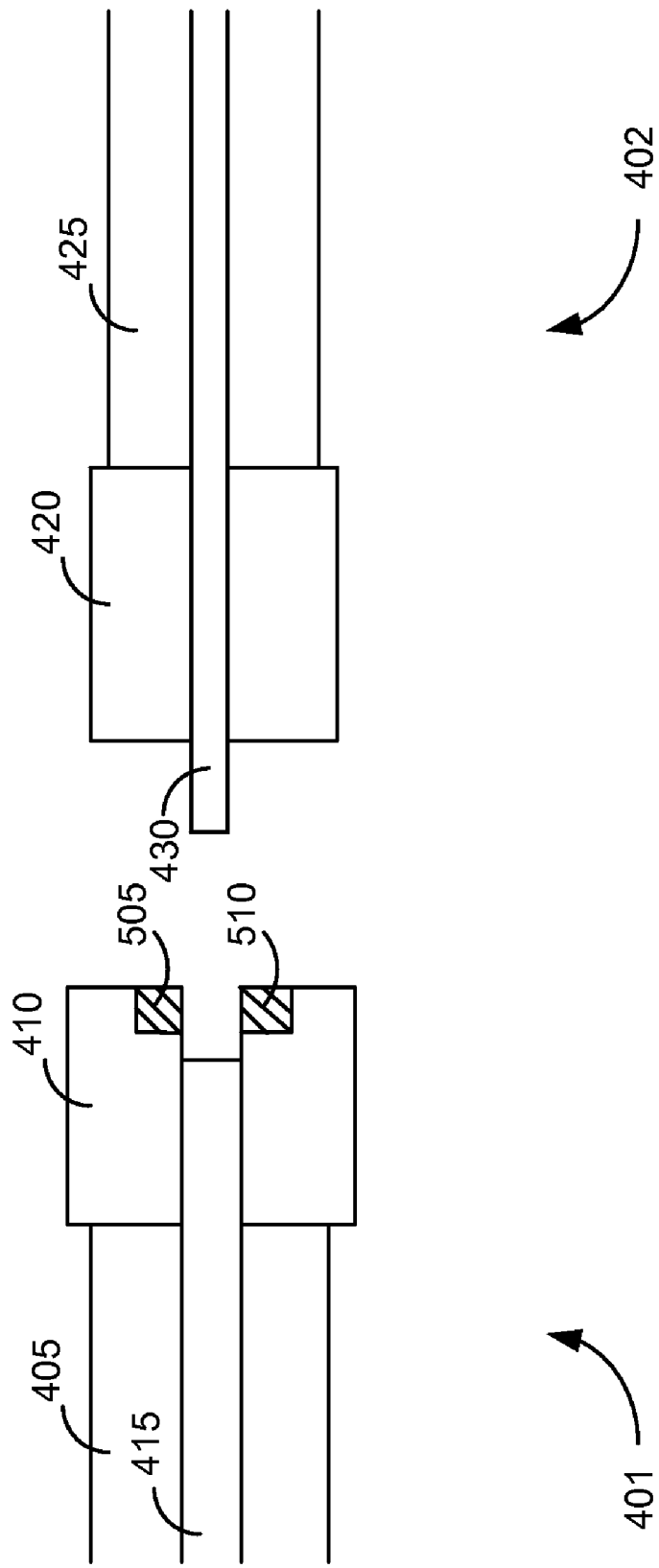
FIG. 5 is a cross-sectional diagram of an example implementation of an incoming cable and a cable receptacle of either the optical-to-electrical patch panel device of FIG. 2 or the electrical-to-optical patch panel device of FIG. 3 having a sensor including capacitance plates.

Reference is next made to FIG. 5, showing cross-sectionally an incoming cable 402 and a cable receptacle 401 of an inject signal port of either optical-to-electrical patch panel device 110 or electrical-to-optical patch panel device 130 having capacitance plates 505 and 510 as sensor 265, 270, 365, or 370.

In the illustrated embodiment, cable receptacle adapter 410 has capacitance plates 505 and 510 mounted on it. For example, capacitance plates 505 and 510 may be mounted on either sides of where cable fiber 430 of incoming cable 402 is to connect with cable receptacle 401. Thus, when incoming cable 402 is not connected to cable receptacle 401, capacitance plates 505 and 510 maintain a certain charge between them. However, when incoming cable 402 is connected to cable receptacle 401 (i.e. the connection of cable fiber 430 to cable receptacle fiber 415), the capacitance between capacitance plates 505 and 510 change. Accordingly, using this capacitance-based mechanism, the sensor 265, 270, 365, or 370 of either optical-to-electrical patch panel device 110 or electrical-to-optical patch panel device 130 may be implemented.

Reference is next made to FIG. 6A, showing cross-sectionally an incoming cable 402 and a cable receptacle 401 of an inject signal port of either optical-to-electrical patch panel device 110 or electrical-to-optical patch panel device 130 having a button 610 and a micro-switch 605 as the sensor 265, 270, 365, or 370.

In the illustrated embodiment, cable receptacle adapter 410 has a button 610 mounted on micro-switch 605. For example, button 610 and micro-switch 605 may be mounted on either sides of where cable fiber 430 of incoming cable 402 is to connect with cable receptacle 401. Micro-switch 605 is capable of detecting very small movements. When incoming cable 402 is not connected to cable receptacle 401, button 610 is in a normal position and does not exert any pressure on micro-switch 605. However, when incoming cable 402 is connected to cable receptacle 401, button 610 is depressed by the head of cable adapter 420 so that it pushes micro-switch 605. Accordingly, using this micro-switch mechanism with a button 610, the sensor 265, 270, 365, or 370 of either optical-to-electrical patch panel device 110 or electrical-to-optical patch panel device 130 may be implemented.

Reference is next made to FIG. 6B, showing cross-sectionally an incoming cable 402 and a cable receptacle 401 of an inject signal port of either optical-to-electrical patch panel device 110 or electrical-to-optical patch panel device 130 having a pair of switch arms 620 and a micro-switch 615 as sensor 265, 270, 365, or 370.

In the illustrated embodiment, the switch arms 620 are mounted on micro-switch 615. For example, switch arms 620 and micro-switch 615 may be mounted on either sides of where cable fiber 430 of incoming cable 402 is to connect with cable receptacle 401. In other embodiments only one switch arm may be provided. Micro-switch 615, as with micro-switch 605 of FIG. 6A, is capable of detecting very small movements. When incoming cable 402 is not connected to cable receptacle 401, switch arms 620 are in a normal position indented inwards (towards the center of the cable receptacle) and do not exert any pressure on micro-switch 615. However, when incoming cable 402 is connected to cable receptacle 401 (i.e. the connection of cable fiber 430 to cable receptacle fiber 415), switch arms 620 are pushed outwards against micro-switch 615. Accordingly, using this micro-switch mechanism with switch arms 620, sensor 265, 270, 365, or 370 of either optical-to-electrical patch panel device 110 or electrical-to-optical patch panel device 130 may be implemented.

Figure 7:
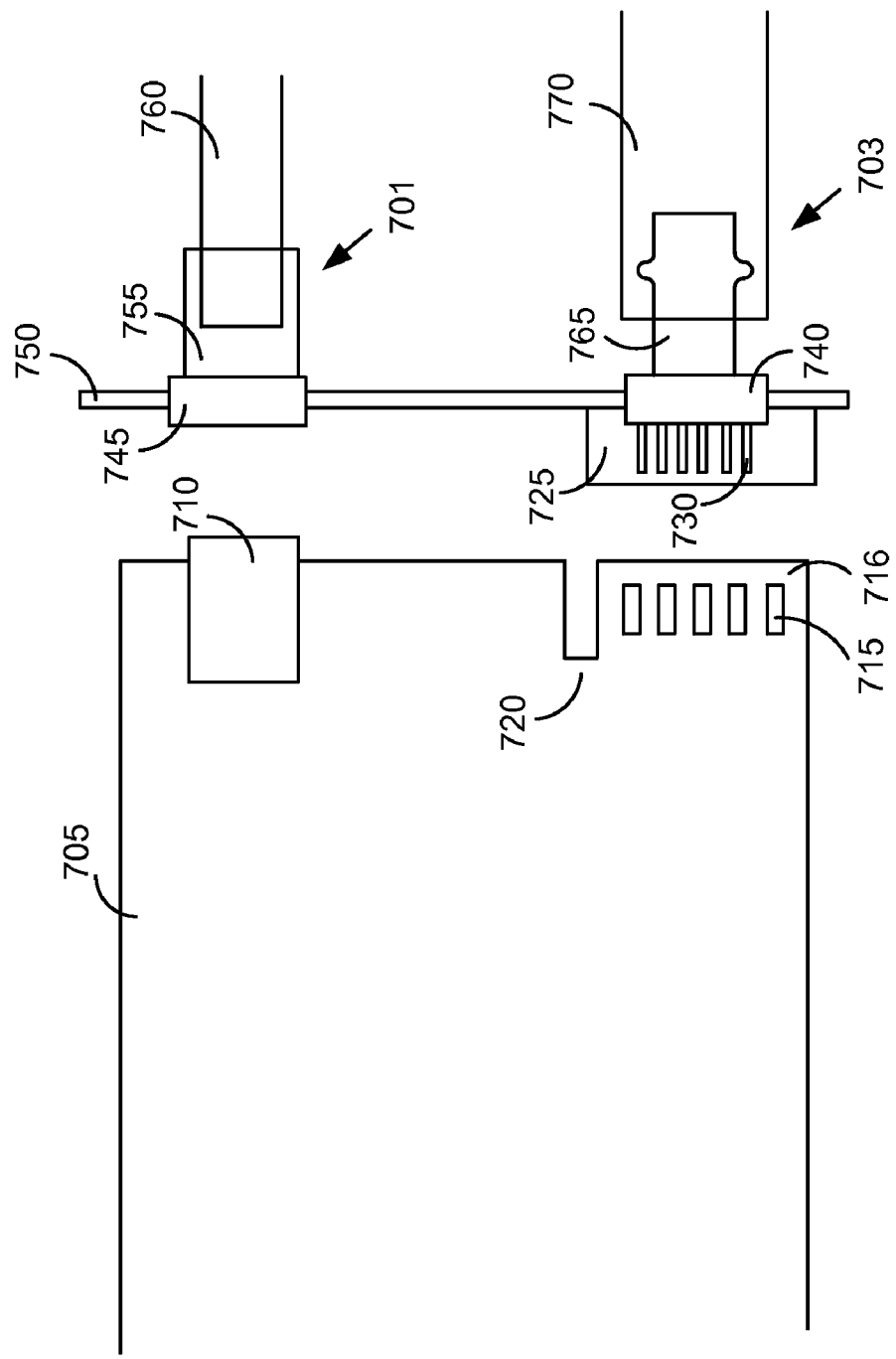
FIG. 7 is a diagram illustrating the physical implementation of either the optical-to-electrical patch panel device of FIG. 2 or the electrical-to-optical patch panel device of FIG. 3.

Reference is next made to FIG. 7, showing the physical implementation of either the optical-to-electrical patch panel device 110 or the electrical-to-optical patch panel device 130. Optical-to-electrical patch panel device 110 and electrical-to-optical patch panel device 130 are implemented such that they are hot-swappable in operation.

In the illustrated embodiment, panel 750 is connected to an optical sub-assembly 701 and an electrical sub-assembly 703. Optical sub-assembly 701 is comprised of optical cable receptacle base 745 connected to an optical cable receptacle 755 of optical cable 760. Electrical sub-assembly 703 is comprised of electrical cable receptacle base 740 connected to an electrical cable receptacle 765 of electrical cable 770. Electrical cable receptacle base 740 is also connected via electrical contacts 730 to electrical cable receptacle 725. A printed circuit board (PCB) 705 housing optical-to-electrical patch panel device 110 or electrical-to-optical patch panel device 130 is comprised of at least an optical fiber cable connector 710 and electrical cable connector 716 having electrical contacts 715. PCB 705 may additional comprise of a notch 720 for easy attachment to panel 750 and removal from panel 750.

In the normal mode of operation, optical fiber cable connector 710 of PCB 705 is connected to optical sub-assembly 701 of panel 750 while electrical cable connector 716 having electrical contacts 715 of PCB 705 is connected to electrical sub-assembly 703 of panel 750. For example, in the optical-to-electrical patch panel device 110 of switching system 100, optical cable 760 would receive input-side incoming optical signal 105 while electrical cable 770 would transmit input-side outgoing electrical signal 115. Similarly, in the electrical-to-optical patch panel device 130 of switching system 100, electrical cable 770 would receive output-side incoming electrical signal 125 while optical cable 760 would transmit output-side outgoing optical signal 135.

However, where there is a failure of the optical-to-electrical patch panel device 110 or of the electrical-to-optical patch panel device 130, PCB 705 can be easily removed from panel 750 for the installation of a replacement PCB carrying either an optical-to-electrical patch panel device or electrical-to-optical patch panel device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A patch panel device comprising:
   an optical signal port for receiving an incoming optical signal;
   an optical inject port for receiving an optical inject signal, wherein the optical inject port has an active mode and an inactive mode;
   a first switch for selecting one or more of the input signals, wherein the switch is response to the mode of the optical inject port;
   an electrical inject port for receiving an electrical inject signal, wherein the electrical inject port has an active mode and an inactive mode;
   a second switch for selecting the signals selected by the first switch or the electrical inject signal or both in response to the mode of the input-side electrical inject port;
   an electrical output port for transmitting an output electrical signal corresponding to the signals selected by the second switch; and
   an optical-to-electrical converter for generating a converted electrical signal in corresponding to the one or more signals selected by the first switch;
   wherein, when the optical inject port is in its active mode, the first switch is operational to include the optical inject signal in the signals selected by the first switch;
   wherein, when the optical inject port is in its inactive mode, the signals selected by the first switch include the incoming optical signal and do not include the optical inject signal;
   wherein, when the electrical inject port is in its active mode, the second switch is operational to include the electrical inject signal in the signals selected by the second switch; and
   wherein, when the electrical inject port is in its inactive mode, the signals selected by the second switch include the one or more signals selected by the first switch and do not include the electrical inject signal.

2. The optical patch panel device of claim 1, further comprising a signal monitor for monitoring the one or more signals selected by the first switch.

3. The optical patch panel device of claim 2, wherein the signal monitor is comprised of a splitter for generating a monitoring signal corresponding to the signals selected by the first switch.

4. The optical patch panel device of claim 1, further comprising a signal monitor for monitoring the one or more signals selected by the second switch.

5. The optical patch panel device of claim 4, wherein the signal monitor is comprised of a splitter for generating a monitoring signal corresponding to the signals selected by the second switch.

6. A patch panel device comprising:
   an optical signal port for receiving an incoming optical signal;
   an optical inject port for receiving an optical inject signal, wherein the optical inject port has an active mode and an inactive mode;
   a first switch for selecting one or more of the input signals, wherein the switch is response to the mode of the optical inject port;
   an electrical output port for transmitting an output electrical signal corresponding to the signals selected by the first switch; and
   an optical-to-electrical converter for generating the output electrical signal corresponding to the one or more signals selected by the first switch;
   wherein, when the optical inject port is in its active mode, the first switch is operational to include the optical inject signal in the signals selected by the first switch; and
   wherein, when the optical inject port is in its inactive mode, the signals selected by the first switch include the incoming optical signal and do not include the optical inject signal.

7. The optical patch panel device of claim 6, further comprising a signal monitor for monitoring the one or more signals selected by the first switch.

8. The optical patch panel device of claim 7, wherein the signal monitor is comprised of a splitter for generating a monitoring signal.

9. A patch panel device comprising:
   an electrical signal port for receiving an incoming electrical signal;
   an electrical inject port for receiving an electrical inject signal, wherein the electrical inject port has an active mode and an inactive mode;
   a first switch for selecting one or more of the input signals, wherein the switch is response to the mode of the electrical inject port;
   an optical inject port for receiving an optical inject signal, wherein the optical inject port has an active mode and an inactive mode;
   a second switch for selecting the signals selected by the first switch or the optical inject signal or both in response to the mode of the input-side optical inject port;
   an optical output port for transmitting an output optical signal corresponding to the signals selected by the second switch; and
   an electrical-to-optical converter for generating a converted optical signal in corresponding to the one or more signals selected by the first switch;

wherein, when the electrical inject port is in its active mode, the first switch is operational to include the electrical inject signal in the signals selected by the first switch;

wherein, when the electrical inject port is in its inactive mode, the signals selected by the first switch include the incoming electrical signal and do not include the electrical inject signal;

wherein, when the optical inject port is in its active mode, the second switch is operational to include the optical inject signal in the signals selected by the second switch;

wherein, when the optical inject port is in its inactive mode, the signals selected by the second switch include the one or more signals selected by the first switch and do not include the optical inject signal.

10. The optical patch panel device of claim 9, further comprising a signal monitor for monitoring the one or more signals selected by the first switch.

11. The optical patch panel device of claim 10, wherein the signal monitor is comprised of a splitter for generating a monitoring signal corresponding to the signals selected by the first switch.

12. The optical patch panel device of claim 9, further comprising a signal monitor for monitoring the one or more signals selected by the second switch.

13. The optical patch panel device of claim 12, wherein the signal monitor is comprised of a splitter for generating a monitoring signal corresponding to the signals selected by the second switch.

14. A patch panel device comprising:
an electrical signal port for receiving an incoming electrical signal;
an electrical inject port for receiving an electrical inject signal, wherein the electrical inject port has an active mode and an inactive mode;
a first switch for selecting one or more of the input signals, wherein the switch is response to the mode of the electrical inject port;
an optical output port for transmitting an output optical signal corresponding to the signals selected by the first switch; and
an electrical-to-optical converter for generating the output optical signal corresponding to the one or more signals selected by the first switch;

wherein, when the electrical inject port is in its active mode, the first switch is operational to include the electrical inject signal in the signals selected by the first switch; and
wherein, when the electrical inject port is in its inactive mode, the signals selected by the first switch include the incoming electrical signal and do not include the electrical inject signal.

15. The optical patch panel device of claim 14, further comprising a signal monitor for monitoring at least one of the input optical signal or the output electrical signal.

16. The optical patch panel device of claim 15, wherein the signal monitor is comprised of a splitter for generating a monitoring signal.

17. A method of operating a patch panel device, the method comprising:
receiving an incoming optical signal;
generating an electrical signal corresponding to the incoming optical signal;
sensing the presence of an optical inject signal;
in response to sensing the presence of the optical inject signal, generating the electrical signal corresponding to the optical inject signal; and
providing an output electrical signal corresponding to the electrical signal.

18. The method of claim 17 further including:
sensing the presence of an electrical inject signal;
in response to sensing the presence of the electrical inject signal, generating the output electrical signal corresponding to the electrical inject signal.

19. A method of operating a patch panel device, the method comprising:
receiving an incoming electrical signal;
generating an optical signal corresponding to the incoming electrical signal;
sensing the presence of an electrical inject signal;
in response to sensing the presence of the electrical inject signal, generating the optical signal corresponding to the electrical inject signal; and
providing an output optical signal corresponding to the optical signal.

20. The method of claim 17 further including:
sensing the presence of an optical inject signal;
in response to sensing the presence of the optical inject signal, generating the output optical signal corresponding to the optical inject signal.

* * * * *